US006958749B1

(12) United States Patent
Matsushita et al.

(10) Patent No.: US 6,958,749 B1
(45) Date of Patent: Oct. 25, 2005

(54) APPARATUS AND METHOD FOR MANIPULATING A TOUCH-SENSITIVE DISPLAY PANEL

(75) Inventors: Nobuyuki Matsushita, Kanagawa (JP); Yuji Ayatsuka, Tokyo (JP); Junichi Rekimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 249 days.

(21) Appl. No.: 09/699,757

(22) Filed: Oct. 30, 2000

(30) Foreign Application Priority Data

Nov. 4, 1999 (JP) .............................. P11-313536

(51) Int. Cl.[7] ............................................... G09G 5/00
(52) U.S. Cl. ................................... 345/175; 178/18.03
(58) Field of Search ............................... 345/863, 864, 345/837, 670–672, 173, 650, 661, 174, 676; 715/864, 863; 178/18.03, 18.05, 18.06

(56) References Cited

U.S. PATENT DOCUMENTS 5,500,935 A * 3/1996 Moran et al. ............... 345/863
5,796,406 A * 8/1998 Shigematsu et al. ........ 345/863
5,821,930 A * 10/1998 Hansen ....................... 345/702
5,844,547 A * 12/1998 Minakuchi et al. ......... 345/173
5,861,886 A * 1/1999 Moran et al. ............... 345/863
5,880,743 A * 3/1999 Moran et al. ............... 345/473
6,347,290 B1 * 2/2002 Bartlett ....................... 702/150
6,400,376 B1 * 6/2002 Singh et al. ................ 345/685
6,414,671 B1 * 7/2002 Gillespie et al. ............ 345/157
6,466,198 B1 * 10/2002 Feinstein .................... 345/158

FOREIGN PATENT DOCUMENTS

JP 09-034625 2/1997
JP 09-034626 2/1997

* cited by examiner

*Primary Examiner*—Sumati Lefkowitz
*Assistant Examiner*—Motilewa Good-Johnson
(74) *Attorney, Agent, or Firm*—Bell, Boyd & Lloyd LLC

(57) ABSTRACT

The present invention enables to easily perform a graphic processing even when a touch panel is used. When a resistance film unit is pressed with a pen or a finger, output voltages associated with the X coordinate and the Y coordinate position are changed and these output voltages are transmitted as the X coordinate data and the Y coordinate data to a touch panel driver. According to the output from the resistance film unit, the touch panel driver generates an event for supply to a GUI handler. The touch panel driver includes a two-point specification detector which detects two point specifications and causes to calculate coordinates of the two points. The GUI handler generates a message corresponding to the GUI according to the event and supplies the message to an application. The GUI handler includes a processing mode modification block which differently interprets the event when a single point is specified and when two points are specified, thereby modifying the graphic processing mode.

2 Claims, 14 Drawing Sheets

APPARATUS AND METHOD FOR MANIPULATING A TOUCH-SENSITIVE DISPLAY PANEL

BACKGROUND OF THE INVENTION

1. Field of the Invention

The present invention relates to a graphic processing apparatus and in particular to an apparatus capable of easily performing graphic processing even when a touch panel is used.

2. Description of the Prior Art

With increase of the computer performance and the technique to reduce the size, various portable computers (personal digital assist, PDA) are now widely used. Most of the conventional PDA employs an interface for performing almost all the operations with a single pen. This is based on the metaphor of a notebook and a pencil.

By the way, a graphic operation is widely performed using a graphic creation software through operation of a keyboard and a mouse. When such a graphic edition operation is to be performed on the aforementioned PDA touch panel using a pen or finger, only one point on the panel can be specified and it is necessary to repeatedly perform a complicated processing. For example, an operation type (such as move) is selected through a menu and a graphic object is moved with the pen. This should be repeated for edition, requiring a complicated process.

Recently, as disclosed in Japanese Patent Publication 9-34625, a technique to simultaneously push two points on the touch panel has been suggested. It is known that this technique is used in the touch panel, in the same way as on a keyboard, for example, an operation combining the Shift key and an alphabet key.

SUMMARY OF THE INVENTION

It is therefore an object of the present invention to provide an apparatus capable of easily performing a graphic processing on the touch panel using the technique to simultaneously enter two points on the touch panel.

That is, the present invention provides a graphic processing apparatus including: a touch panel; means for deciding whether a single point or two points are specified on the touch panel; means for performing a graphic processing in a first graphic processing mode when the single point is specified; and means for performing a graphic processing in a second graphic processing mode when the two points are specified.

With this configuration, it is possible to select a graphic processing mode according to the number of points specified and accordingly, it is possible to select a predetermined graphic processing with a small number of operation steps. For example, when a single point is specified, a graphic object is moved and a segment is drawn on point basis and when two points are specified, it is possible to perform edition such as enlargement, reduction, and rotation. In this case, the edition types may be identified by the moving state of the specified position. For example, when a first point is fixed and a second point is moved apart from the first point, enlargement or reduction is performed in this direction and rotation is performed around the fixed point.

Moreover, the present invention provides a portable computer including: a frame which can be grasped by a user's hand; a touch panel formed on the upper surface of the frame; detection means for detecting specification of a predetermined area on the touch panel in the vicinity of a region where a user's thumb is positioned when he/she grasps the portable computer; interpretation means for interpreting another point specification on the touch panel in a corresponding interpretation mode according to a detection output from the detection means while the predetermined area is specified; and execution means for executing a predetermined processing according to a result of the interpretation.

With this configuration, it is possible to specify a point on the touch panel with a pen or a finger and to specify a predetermined area on the touch panel using a thumb of the hand grasping the portable computer body. In the conventional example, one hand is used for grasping a portable terminal and the other hand is used to specify a position on the touch panel. In the present invention, the thumb which has not been used conventionally can be used to select a menu and an operation mode.

Furthermore, the present invention provides a coordinate position input apparatus including: a touch panel for outputting a coordinate data of a middle point when two points are simultaneously touched; storage means for retaining coordinate position of the two points detected previously; detection means for detecting a coordinate position of a current middle point; and calculation means for calculating a coordinate of one of the two touch points assumed to be a moving point by subtracting a coordinate position of a previous fixed point from a current middle point coordinate multiplied by 2.

With this configuration, by employing a user interface to assume one of the two touch points fixed, it is possible to easily and correctly calculate a coordinate position even when one of the two touch points is moved.

It should be noted that at least a part of the present invention can be realized as a computer software, and can be implemented as a computer program package (recording medium).

DETAILED DESCRIPTION OF A PREFERRED EMBODIMENT

Description will now be directed to a preferred embodiment of the present invention with reference to the attached drawings.

Figure 1:
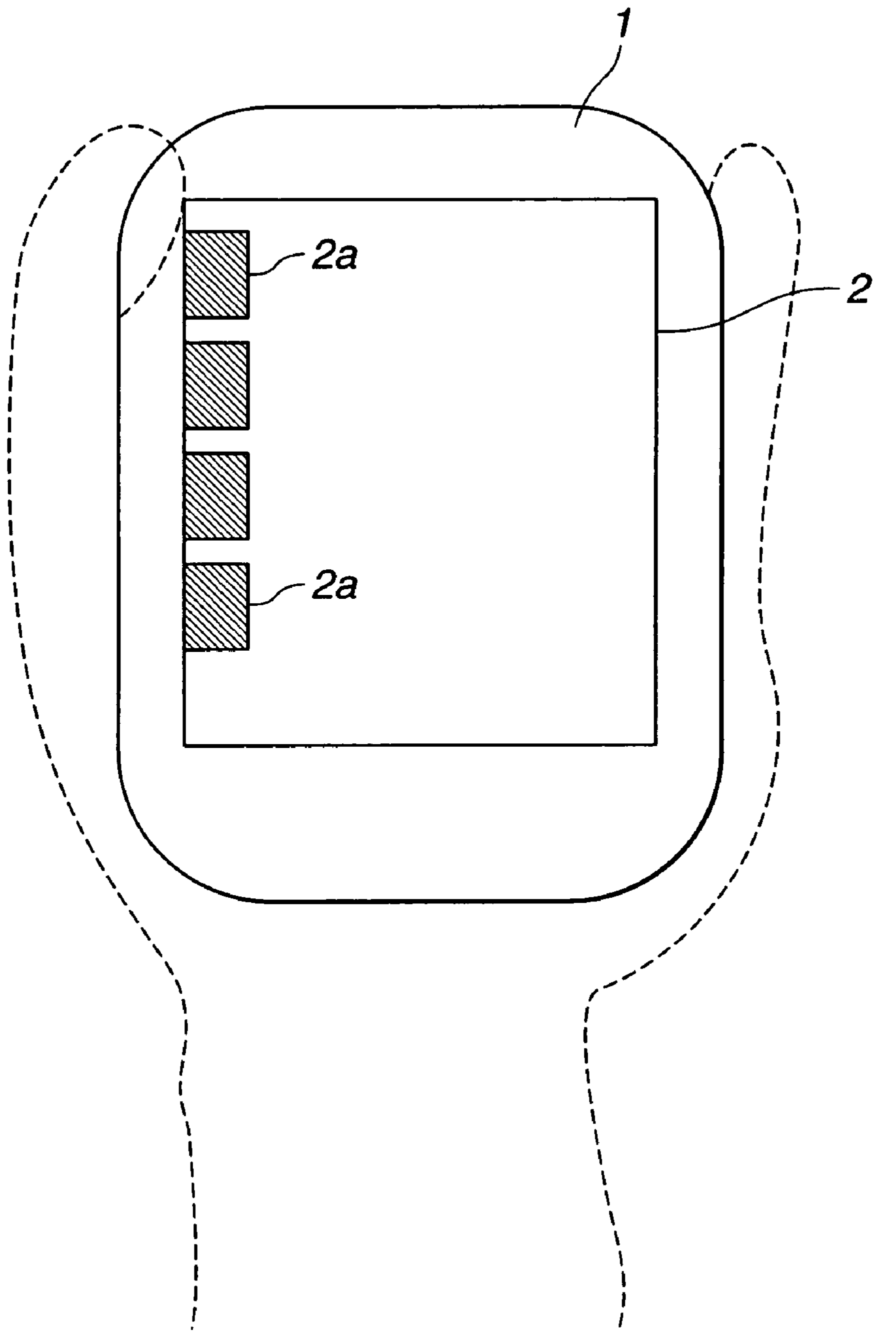
FIG. 1 shows a portable computer according to an embodiment of the present invention.

FIG. 1 is an external view of a portable computer according to the embodiment. In this figure, the portable computer 1 has a flattened cubic configuration of a size that can be grasped by one hand of a grownup. The portable computer 1 has on its upper side a pressure-sensitive (resistance type) touch panel 2. The touch panel is an ordinary pressure-sensitive type. When pressed with a pen (not depicted) or finger, a change of an inter-terminal voltage is detected so as to enter coordinates. In this embodiment, by properly designing the size of the portable computer 1, the user can freely move his/her thumb while grasping the portable computer 1. As shown in the figure, buttons 2*a* are arranged in the vicinity of user's thumb, so that the user can specify the buttons 2*a* while grasping the portable computer 1. The buttons 2*a* may be displayed or may not be displayed in a predetermined mode.

Figure 2:
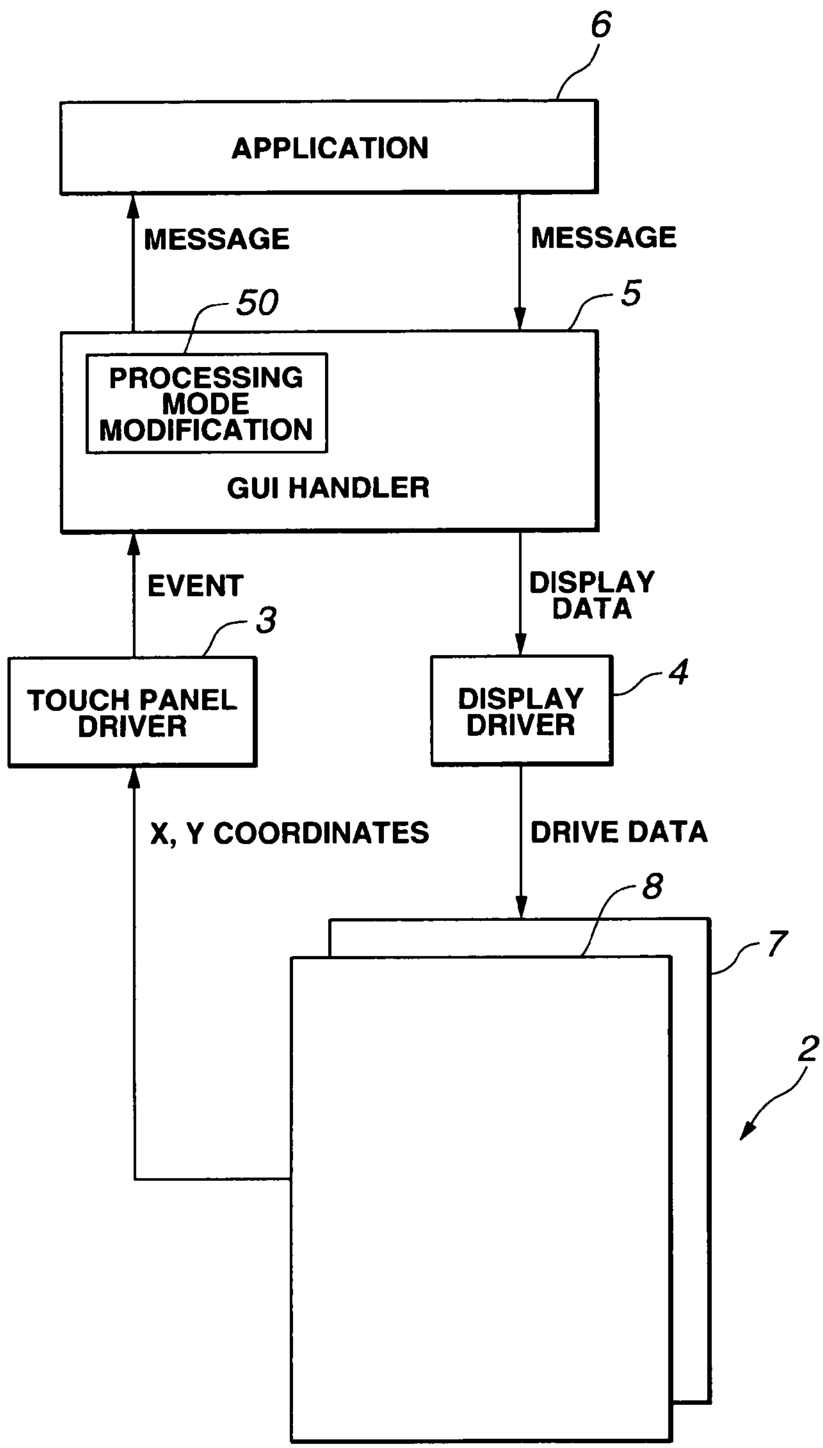
FIG. 2 is a block diagram showing a functional configuration of the aforementioned embodiment.

FIG. 2 shows functional blocks realized by internal circuits and the touch panel 2 of the portable computer 1. The functional blocks realized by the portable computer 1 are a touch panel driver 3, a display driver 4, a graphical user interface (GUI) handler 5, an application 6, and the like. Moreover, the touch panel 2 includes a liquid crystal display unit 7 and a resistance film unit 8. It should be noted that components not related to the present invention will not be explained. Moreover, hardware (CPU, recording apparatus, and the like) constituting the aforementioned functional blocks are identical as an ordinary portable terminal and its explanation is omitted.

The application 6 includes a database application for managing an individual information, a mail application, a browser, an image creation application, and the like. The application 6 can be selected through a menu and some of the application 6 such as the mail application may be selected by a push button (mechanical component). The application 6 creates a message related to display and supplies the message to the GUI handler 5. Upon reception of this message, the GUI handler 5 creates a display image information and transfers it to the display driver 4. The display driver 4, according to the display data, drives the liquid crystal display unit 7 to display information for the user.

When the resistance film unit 8 is pressed by a pen or a finger, output voltages associated with a coordinate X and coordinate Y are changed and these output voltages are transmitted as X coordinate data and Y coordinate data to the touch panel driver 3. The touch panel driver 3, according to the outputs from the resistance film unit 8, generates an event including information such as a touch panel depression, depression release, finger position, and the like and supplies the event to the GUI handler 5. The GUI handler 5, according to the event, generates a message corresponding to the GUI and supplies it to the application 6.

Figure 3:
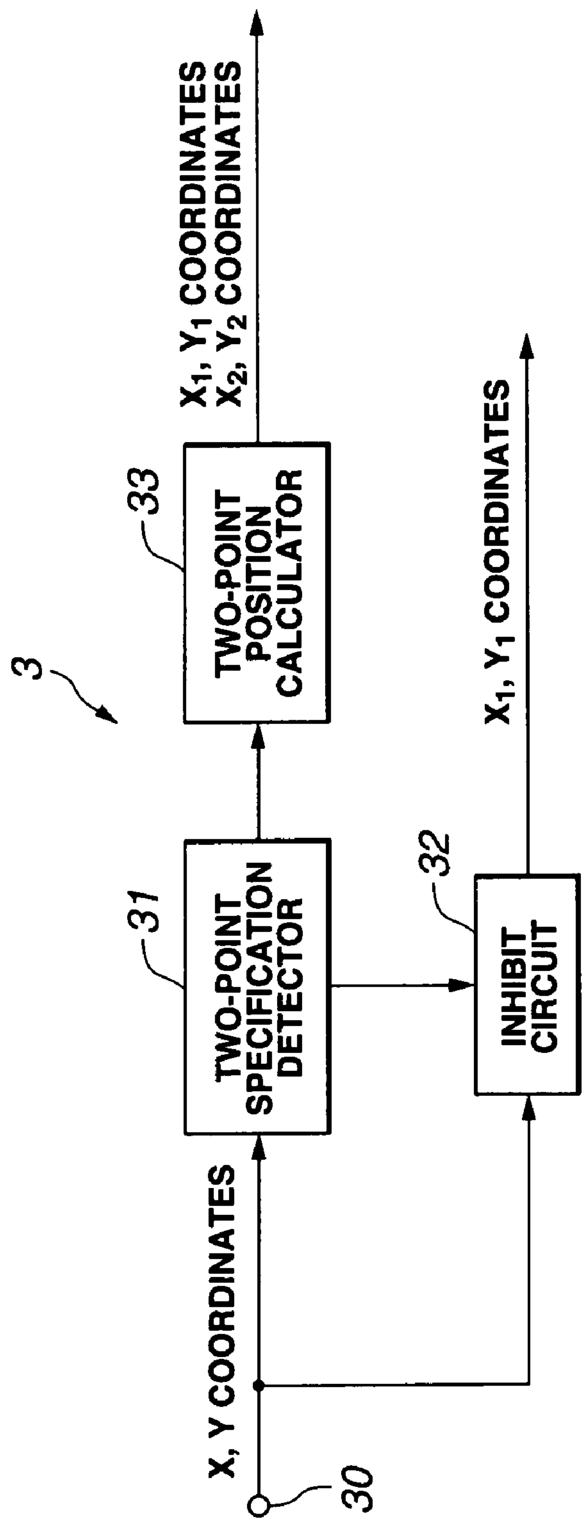
FIG. 3 is a block diagram explaining an essential portion of a touch panel driver in the aforementioned embodiment.

FIG. 3 shows a configuration example associated with the specified position detection of the touch panel driver 3. In this figure, the touch panel driver 3 includes a two-point specification detector 31, an inhibit circuit 32, and a two-point position calculator 33. The two-point specification detector 31 detects that two points are specified and its specific method will be explained later with reference to FIG. 13 and FIG. 14. Specified coordinate data (X, Y) is entered from an input block 30. When only one point is specified on the touch panel 2, a coordinate data (X, Y) from the touch panel 2 is output as a detected coordinate data ($X_1$, $Y_1$). When two points are specified on the touch panel 2, coordinates of an intermediate point between them are output as coordinate data (X, Y). When the two-point specification detector 31 decides that two points are specified, the two-point specification detector 31 drives the inhibit circuit 32 so as to inhibit output of the input data as it is. Moreover, upon detection of that two points are specified, the two-point specification detector 31 uses the input data latched in the preceding value timing (coordinate data ($X_1$, $Y_1$) when one point is specified) and a current input data (X, Y) so as to calculate new specification position coordinates ($X_2$, $Y_2$) by extrapolation and outputs the coordinates data of two points ($X_1$, $Y_1$) and ($X_2$, $Y_2$). When the two-point specification detector 31 detects that the two point specification is released, the two-point specification detector 31 disables the inhibit circuit 32 so as to output an input data as it is.

Thus, an even can be generated when a single point is specified and when two points are specified.

Figure 4:
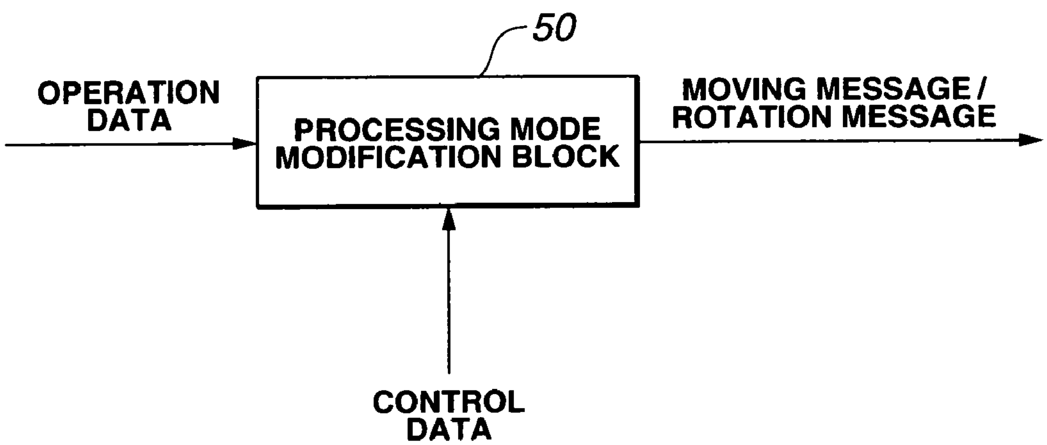
FIG. 4 explains a mode modification block in the aforementioned embodiment.

FIG. 4 explains a configuration of a processing mode modification block 50. The processing mode modification block 50 is arranged, for example, in the GUI handler 5. In FIG. 4, the processing mode modification block 50 receives a control data input (event) and an operation data input (event). In the example of FIG. 4, the control data supplied indicates whether a single point has been specified or two points have been specified. Different mode processes are performed depending on whether the control data indicates a single point specification or two-point specification. For example, in the case of the graphic process application, when the control data indicates a single point specification, the operation data is interpreted as a command to move an object to be operated and the corresponding move message is supplied to the application 6. On the other hand, when the control data indicates two-point specification, the operation data is interpreted as a command to rotate an object to be operated and a rotation message is supplied to the application 6.

Figures 5A, 5B, 5C, 5D, 5E, 5F:
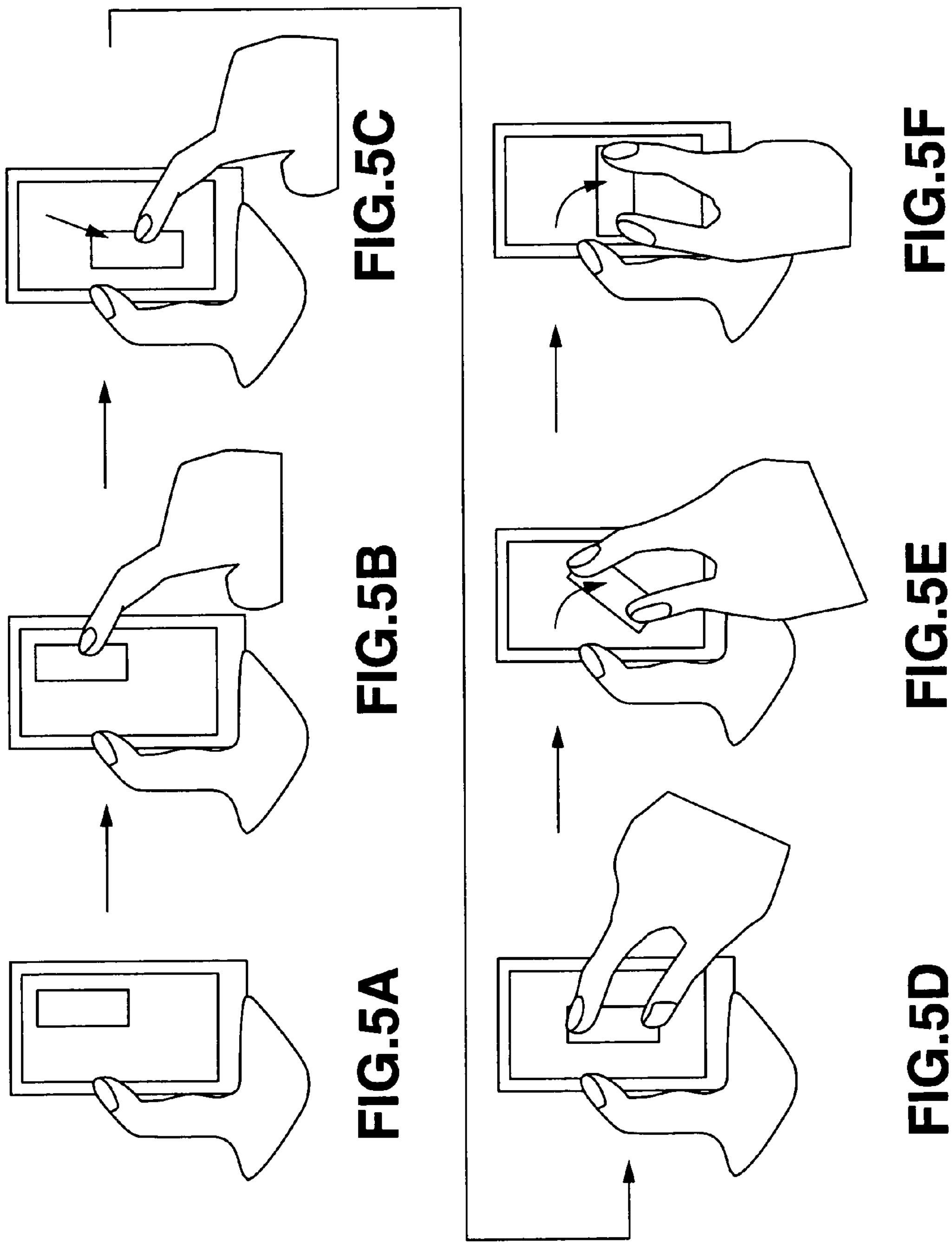
FIGS. 5A, 5B, 5C, 5D, 5E and 5F show an operation state in the aforementioned embodiment.

FIGS. 5A, 5B, 5C, 5D, 5E and 5F an operation example to process an graphic object using such a processing mode modification block 50. It should be noted that in this example, it is assumed that the graphic processing application is executed. In FIG. 5A, at an initial stage, it is assumed that a rectangular object is displayed. This can be created by the application 6 or selected through a menu. Next, this rectangular object is touched (pressed) by a finger, as shown in FIG. 5B and when the finger is moved while pressing the rectangular object, the rectangular object is also moved, as shown in FIG. 5C. Next, the rectangular object is pressed at two points, as shown in FIG. 5D. When one of the finger is rotated around the other while pressing the rectangular object, the rectangular object is rotated, as shown in FIGS. 5E and 5F.

Figure 6:
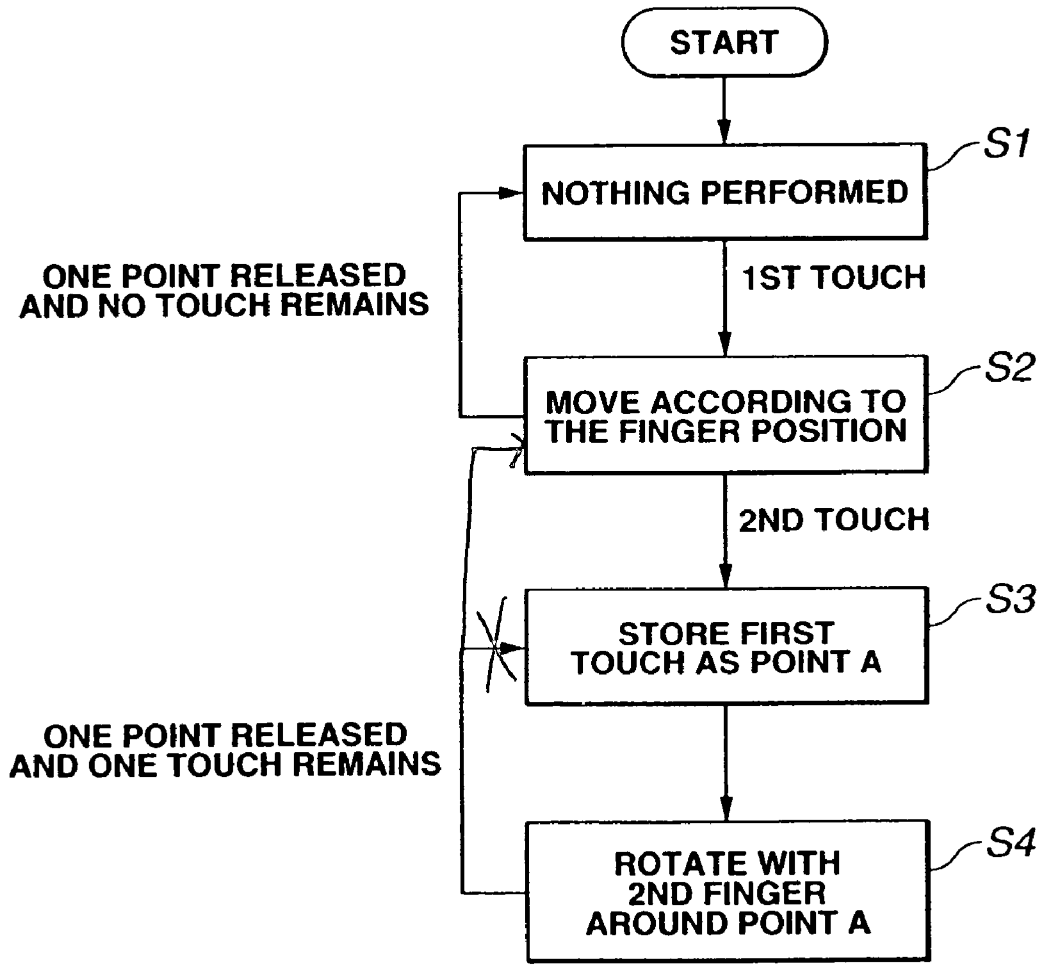
FIG. 6 explains a control operation in the aforementioned embodiment.

FIG. 6 explains operation of a control block for executing the operation of FIG. 5. The control block executing this process includes the GUI handler 5 and the application 6. In FIG. 6, no operation is performed in state S1. Next, a first finger touches the panel and a graphic object moves according to the finger position in state S2. In state S2, if the first finger is released, the state S1 is again set in. Moreover, in state S2, if a second finger touches the panel, state S4 is set in so that the position of the first finger is stored as point A (S3) and the second finger can rotate the graphic object around the point A. In state S4, if one of the fingers is released and the remaining single finger is in the touch state, state is returned to S2 so that the graphic object is moved.

As has been described above, the processing mode can be switched between the move mode and the rotation mode depending oh whether a single point or two points are pressed on the touch panel 2. Thus, a graphic object can easily be operated. It should be noted that the mode can be switched by specifying three positions.

Figure 7:
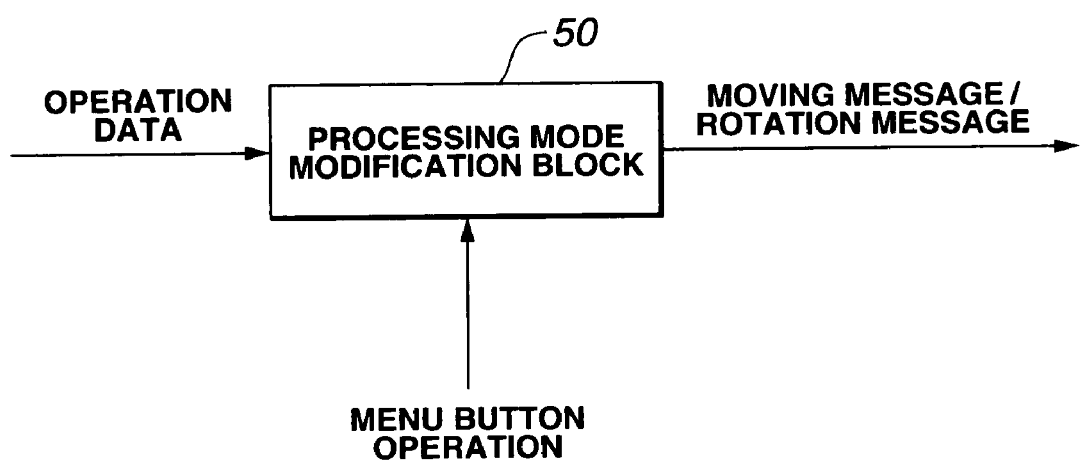
FIG. 7 explains a mode modification block in a modified example of the aforementioned embodiment.

Next, explanation will be given on a modified example of the aforementioned embodiment. FIG. 7 explains the processing mode modification block 50 in the modified example. In this figure, as a control data, a data (event) indicating whether a predetermined button is pressed is entered. The buttons 2*a* are arranged in a straight line as shown in FIG. 8 so as to be in the vicinity of the thumb of the user. Each of the buttons can be specified by slightly moving the thumb. When the control data indicates a predetermined button, the operation data is processed in the corresponding mode.

Figures 8A, 8B, 8C, 8D, 8E, 8F:
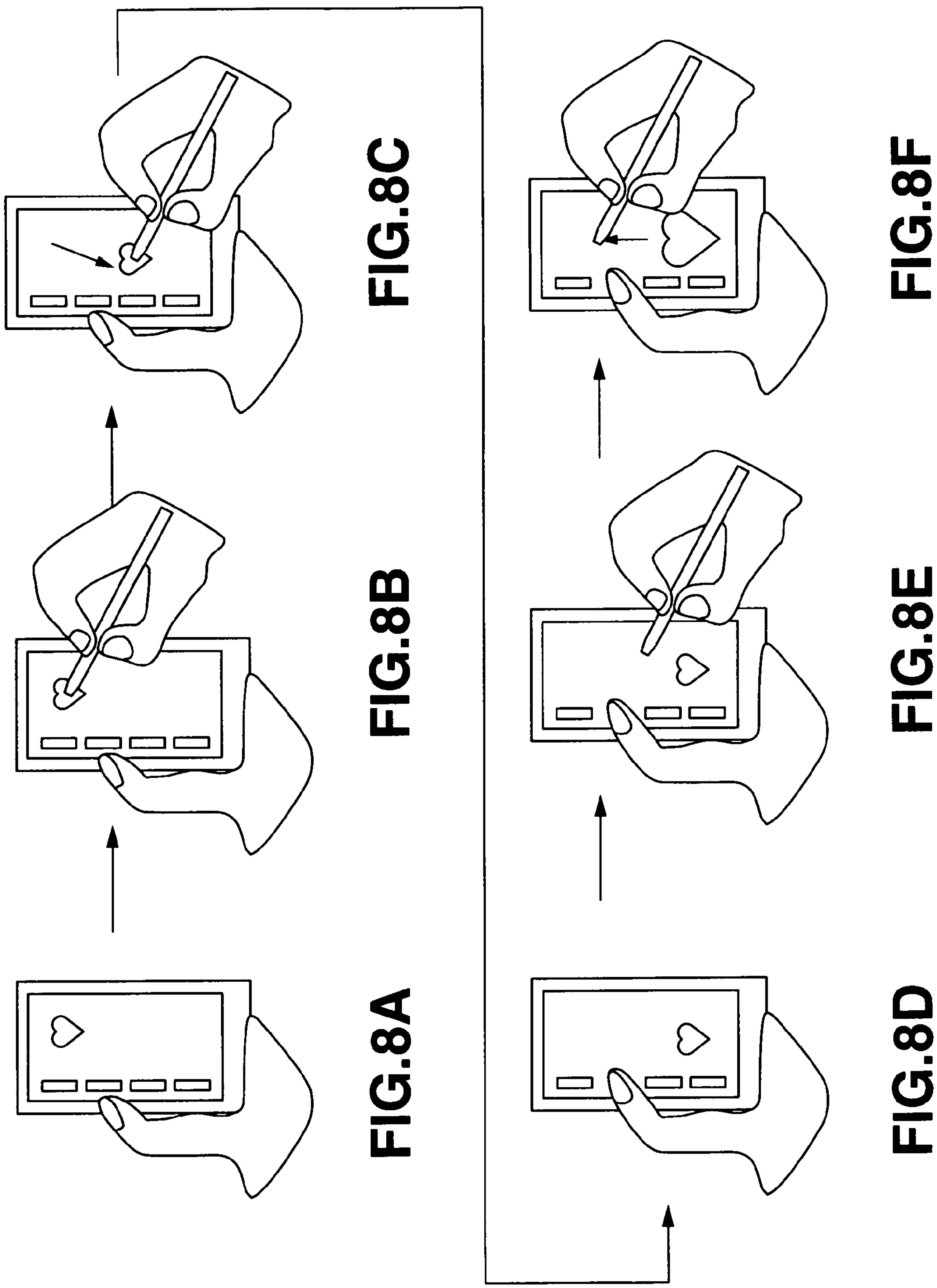
FIGS. 8A, 8B, 8C, 8D, 8E and 8F show an operation state of the modified example of FIG. 7.

FIGS. 8A, 8B, 8C, 8E and 8F shows an operation example using the processing mode modification block 50 of FIG. 7. In this example also, it is assumed that the graphic processing application is executed. When no buttons 2*a* are specified, as shown in FIG. 8A, it is possible to specify and move a graphic object, as shown in FIGS. 8B and 8C. In this example, a heart-shaped object is moved to the lower left direction. Next, when the second button 2*a* from the top (enlarge/reduce button) is pressed, as shown in FIG. 8D, the enlarge/reduce mode is selected and so that the graphic object can be enlarged or reduced by specifying with a pen or finger. In this example, the pressing position is moved upward so as to enlarge the graphic object, as shown in FIGS. 8E and 8F. On the other hand, when the pressing position is moved downward, reduction is performed. Processes other than enlarge/reduce can also be performed by pressing a corresponding button. The buttons arranged at the left side of the touch panel in this example but they may be arranged at the right side. It is also possible to configure the apparatus so that the arrangement of the buttons can be switched. In such a case, the portable computer 1 may be grasped by the user's right hand or left hand.

Figure 9:
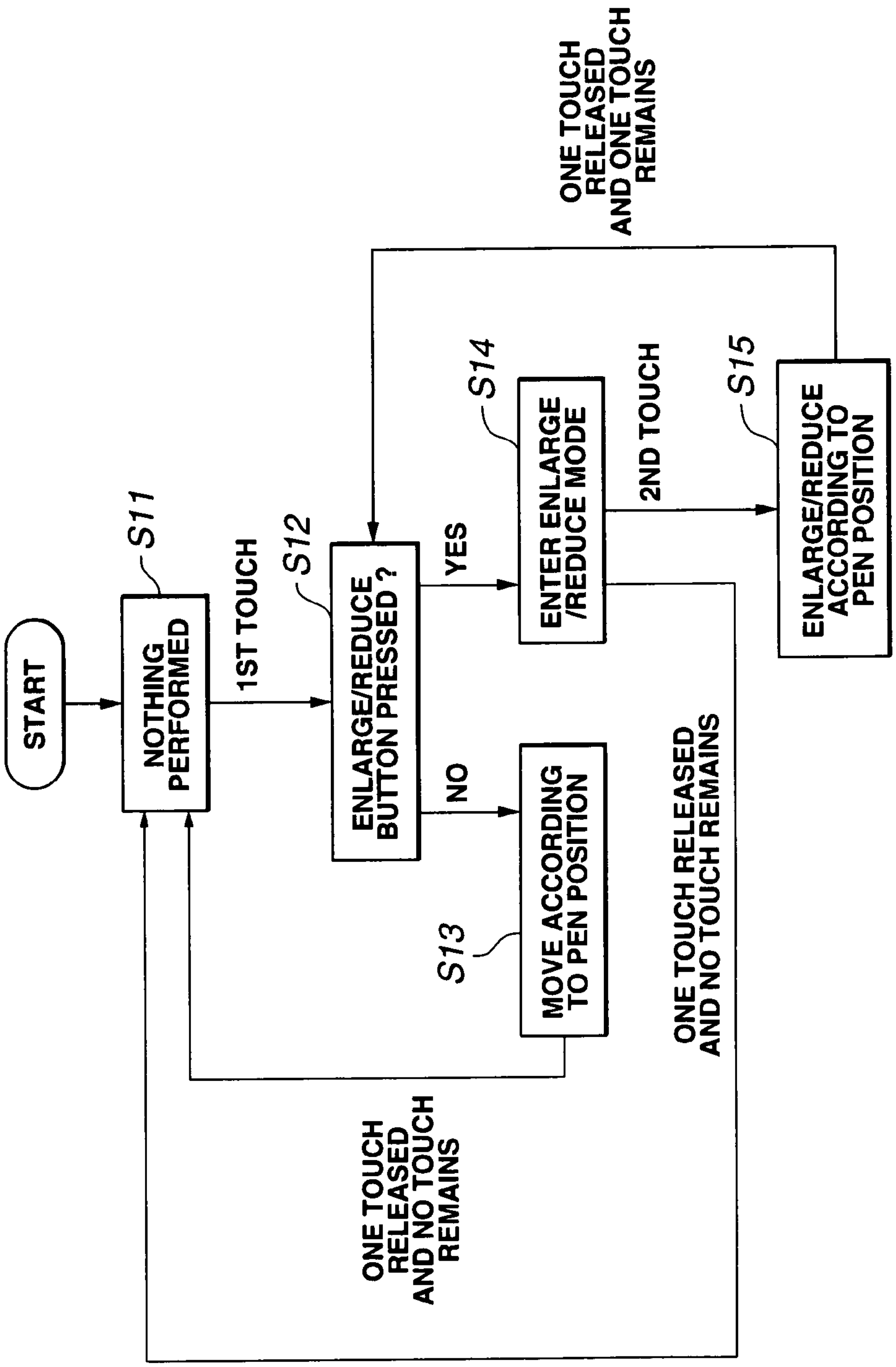
FIG. 9 is a flowchart explaining a control operation in the modified example of FIG. 7.

FIG. 9 is a flowchart explaining the process of FIG. 8. Initially, at state S11, nothing is performed. Next, when an area other than the enlarge/reduce button is pressed (S12), control is passed to state S13 where an object is moved together with the position of a pen. When the enlarge/reduce button is pressed (S12), control is passed to state S14 to wait for a second pen (or finger) tough in the enlarge/reduce mode. If a second pen (finger) touch is performed in state S14, control is passed to state S15 where enlarge/reduce is performed in accordance with the pen position. Moreover, if the touch is released in step S13 and S14, control is returned to state S11 where nothing is performed. When the touch of the enlarge/reduce button is released in state S15, control is passed to state S13 where the object is moved. Moreover, if the other touch than the touch of the enlarge/reduce button is released in state S15, control is returned to state S14 to wait for a touch specifying enlargement or reduction.

It should be noted that while explanation has been given on the enlarge/reduce button in FIG. 9, the other button functions are performed in the same way.

Next, explanation will be given on another modified example of the aforementioned embodiment.

Figure 10:
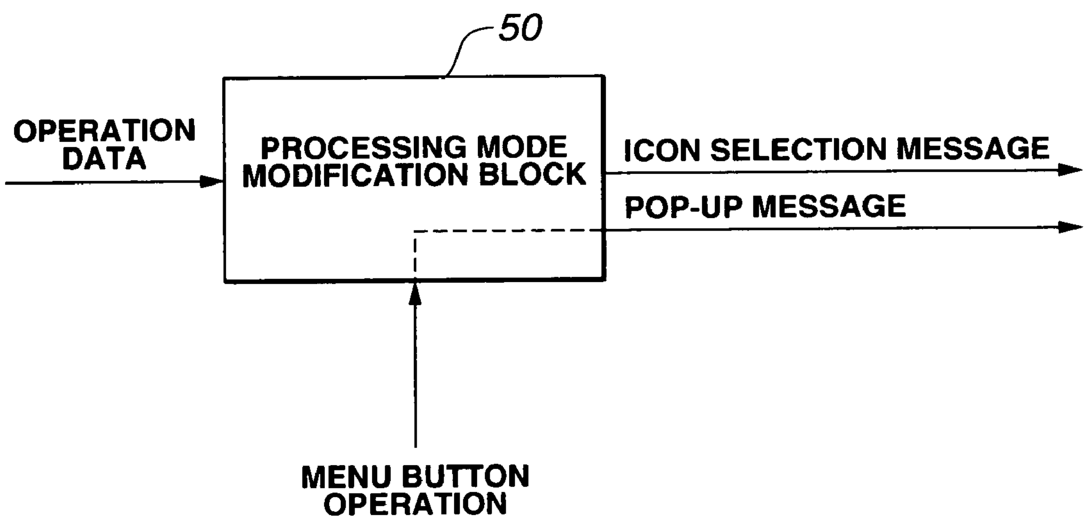
FIG. 10 explains a mode modification block in another modified example of the aforementioned embodiment.

FIG. 10 explains the processing mode modification block 50 of the modified example. In this figure also, a data indicated whether a button is pressed is entered as a control data (event). This data is also entered as an operation data and a corresponding menu is displayed. With the menu displayed, if a data is entered to operate an item selected in the menu, a predetermined processing is performed.

Figures 11A, 11B, 11C, 11D, 11E, 11F:
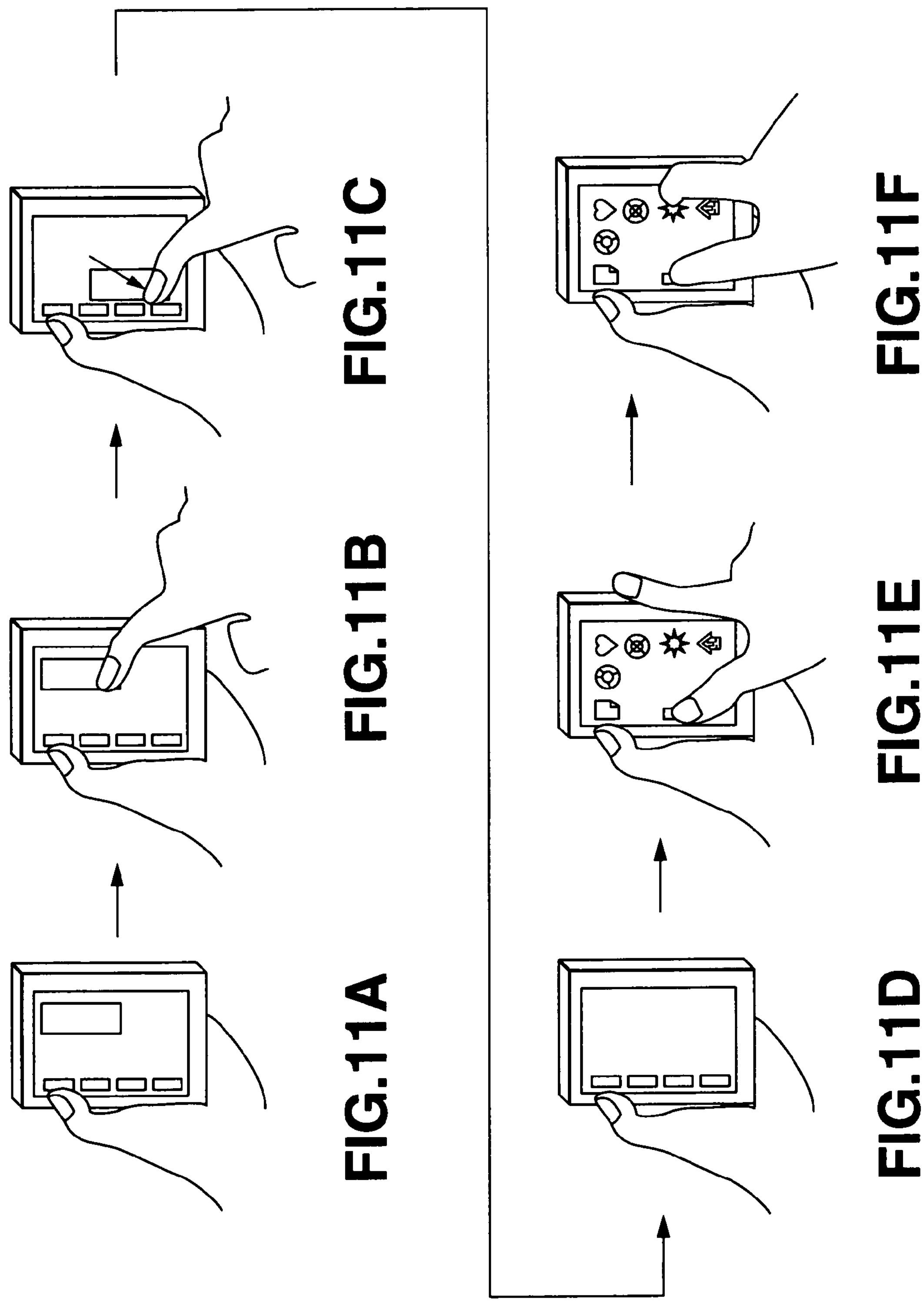
FIGS. 11A, 11B, 11C, 11D, 11E AND 11F explain an operation state of the modified example of FIG. 10.

FIG. 11 shows a processing state in the modified example of FIG. 10. In this example, an application to select a processing according to a predetermined icon is executed. In FIG. 11A, buttons 2*a* are displayed in a vertical straight line at the left side of the touch panel 2 in the same way as the example of FIG. 8. If a graphic object is specified without specifying any of the buttons, the move processing is executed so that the object is moved together with the specification point, as shown in FIGS. 11B and 11C. Next, when a predetermined button 2*a* is pressed, a corresponding menu (a plurality of objects) is displayed, as shown in FIGS. 11D and 11E. Here, the other buttons disappear. When the remaining button and one of the icons (objects displayed) are simultaneously touched, a corresponding processing is performed, as shown in FIG. 11F. In this example, an icon group corresponding to the button 2*a* is displayed. It should be noted that in this example, two fingers of the right hand are used for operation but it is also possible to operate using the thumb of the left hand and one finger of the right hand or a pen. Moreover, the buttons 2*a* arranged at the left side of the touch panel 2 may also be arranged at the right side of the touch panel 2 instead. It is also possible to configure the apparatus so that the arrangement of buttons 2*a* can be switched between the right side and the left side of the touch panel 2.

Figure 12:
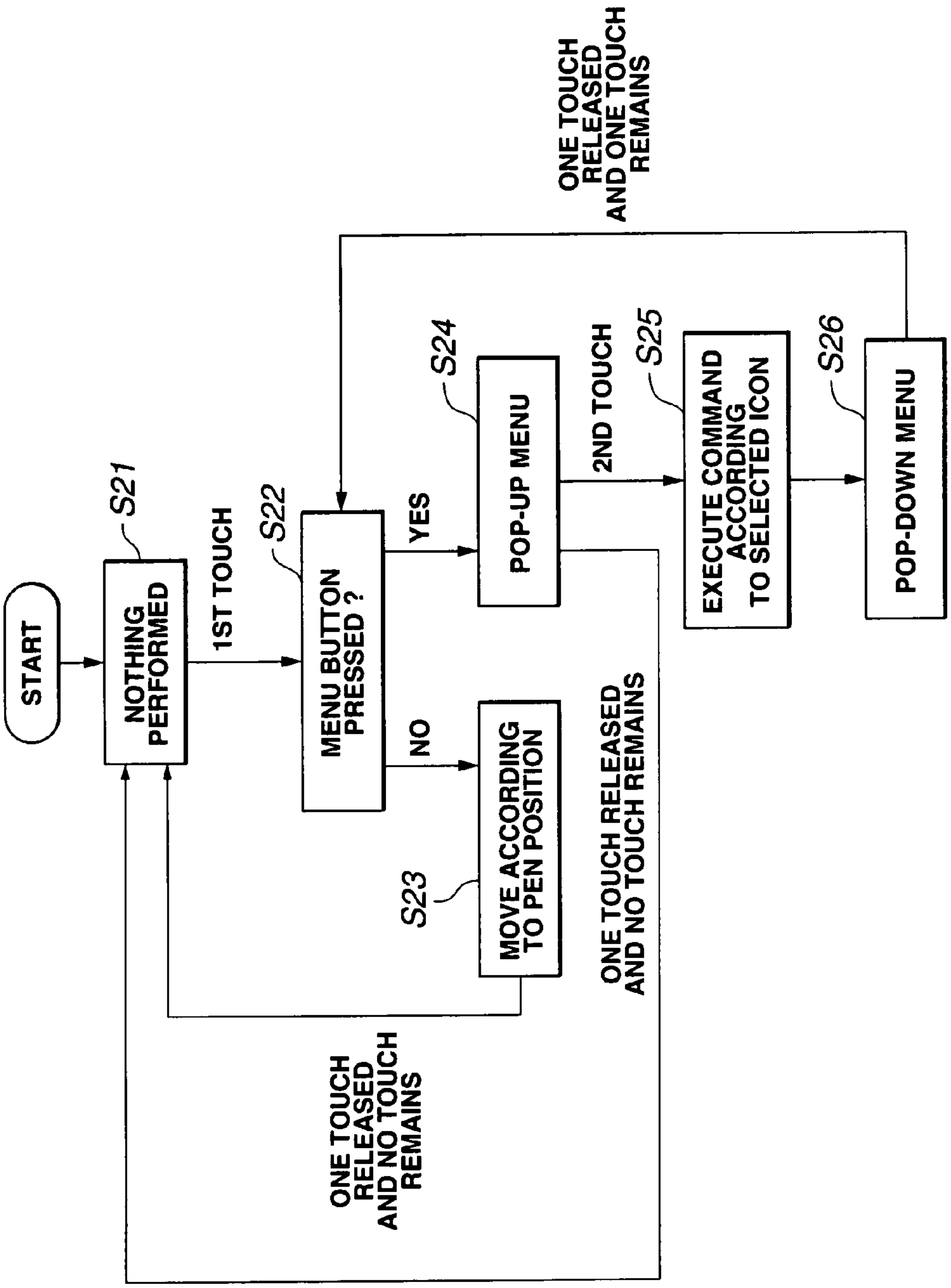
FIG. 12 is a flowchart explaining a control operation in the modified example of FIG. 10.

FIG. 12 is a flowchart explaining the control operation of FIG. 10. In FIG. 12, firstly, nothing is performed in state S21. In state S21, if a first touch specifies a graphic object without specifying any of the menu buttons 2*a* (S22), control is passed to state S23 where the graphic object is moved together with the movement of the pen. In state S21, if the first touch specifies the menu button 2*a* (S22), a corresponding menu pops up and control is passed to state S24 where the touch state is monitored. In state S24, if a second touch selects an icon, a selected command is executed (S25), the menu is pulled down, and control is passed to state S26 where the touch state is monitored. In state S26, when the touch of the menu button is released, control is passed to state S23 where the object is moved. In state S26, when the touch of the icon is released, control is returned to state S24 where the menu pops up. Moreover, in state S23 and state S24, when the other touch is also released, control is returned to state S21.

Figure 13:
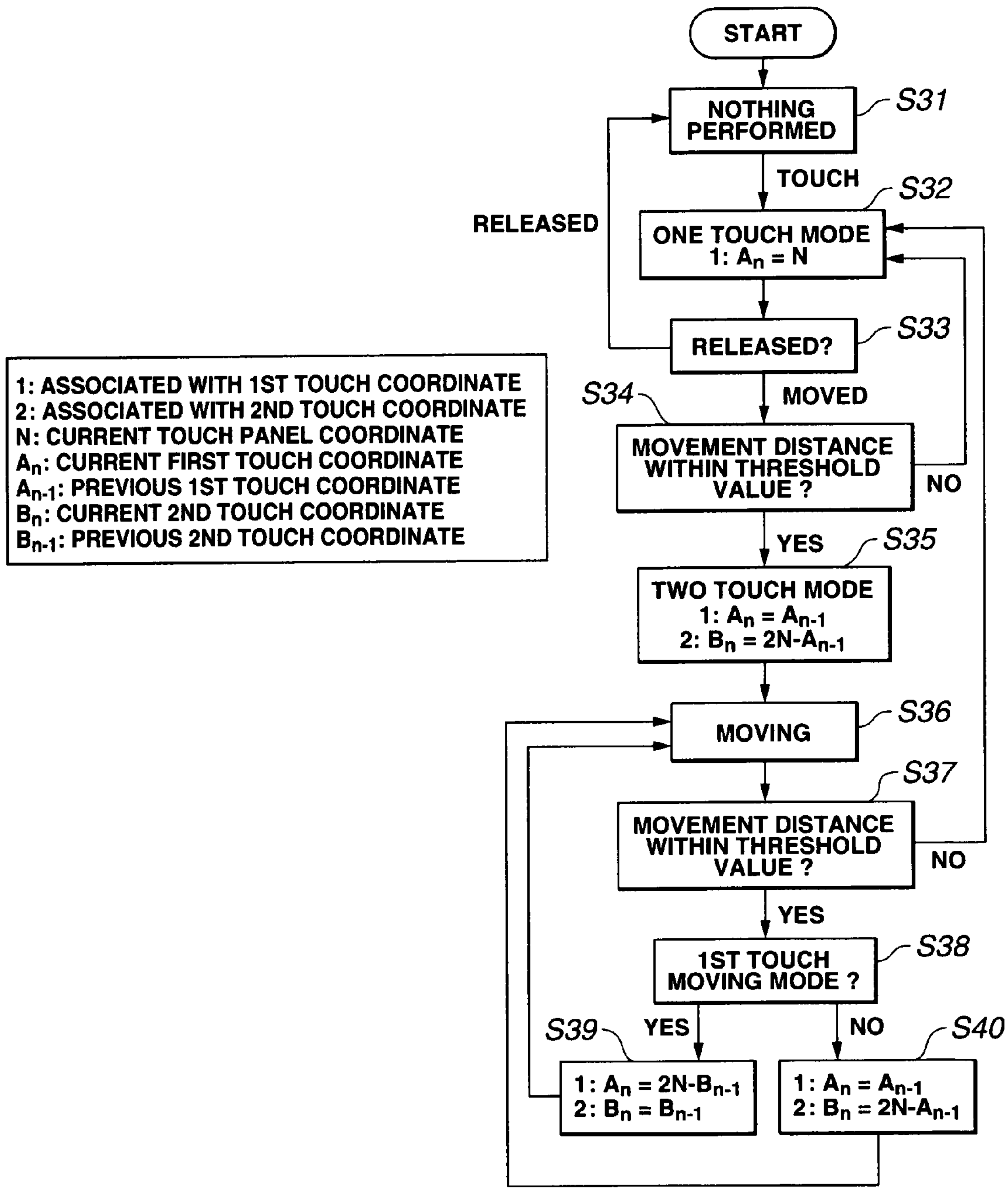
FIG. 13 is a flowchart explaining coordinate position calculation processing.
Figures 14A, 14B, 14C:
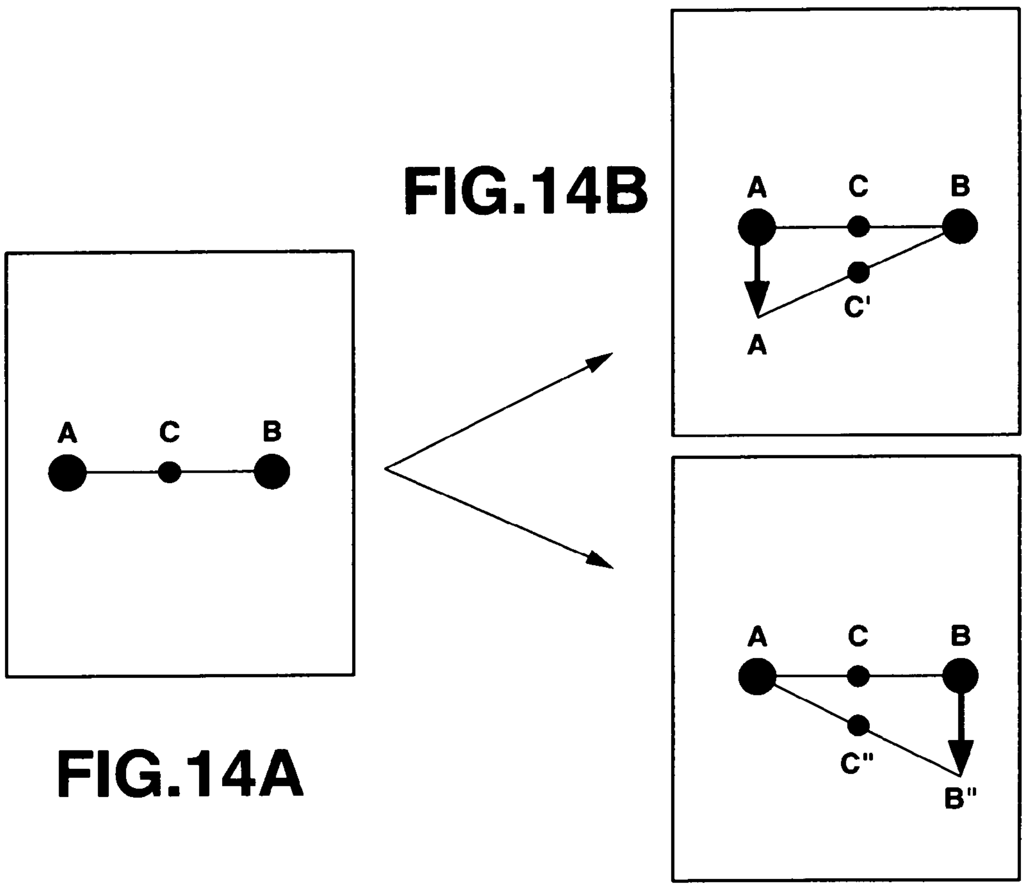
FIGS. 14A, 14B, 14C, are additional explanations to the coordinate position calculation processing of FIG. 13.

Next, explanation will be given on the two-point specification detection and the coordinate data calculation in the aforementioned embodiment. FIG. 13 shows an operation of the two-point specification detection and the coordinate data calculation. It should be noted that symbols used have meanings shown in the figure. Moreover, FIGS. 14A, 14B and 14C explain a scheme employed by the GUI: FIG. 14A shows that nothing is performed; FIG. 14B assumes that a first touch point A is moved; and FIG. 14C assumes that a second touch point B is moved. It is determined in advance whether to employ FIG. 14B or FIG. 14C. It is also possible to switch between FIG. 14B and FIG. 14C through a button operation according to whether the use is right-handed or the left-handed.

In FIG. 13, firstly nothing is performed in state S31. In state S31, if a first touchy is performed, control is passed to a first touch coordinate calculation mode state S32. In state S32, a detected coordinate position N of the touch panel 2 is received, which is entered as the current first touch position coordinate $A_n$. In state S32, it is decided whether the touch is released or the touch point is moved at a predetermined time interval (S33). When the touch is released, control is returned to state S31. When the touch point is moved, it is determined whether the movement distance is within a threshold value (S34). If the movement distance exceeds the threshold value, it is determined that two points are touched and control is passed to a two-point touch coordinate position calculation mode state S35. That is, the previous first coordinate $A_{n-1}$ is made the current first coordinate $A_n$, and the previous first coordinate value $A_{n-1}$ is subtracted from the current coordinate data N multiplied by 2 so as to obtain a current second coordinate value $B_n$. That is, $B_n=2N-A_{n-1}$. If the movement distance is within the threshold value, it is determined that only one touch has been made previously and control is returned to state S32. Normally, when the specification position is moved continuously using a pen or finger, the movement distance per a unit time is not so great. In contrast to this, when a second touch is performed, the apparent coordinate position is changed in the stepped way up to the middle point. Accordingly, it is possible to detect such a sudden movement to identify a two-point specification.

Next, in state S35 (two-point mode), the movement is monitored to determine whether the movement distance is within the threshold value (S36, S37). If within the threshold value, the two-point mode is identified. As has been described above, it is determined in advance which of the touch points is moved for each GUI. As shown in FIG. 14B, if the first touch position is moved according to the GUI design (S38), the first touch position coordinate $A_n$ is calculated by $A_n=2N-B_{n-1}$ (S39) while the second touch position remains unchanged ($B_n=B_{n-1}$). On the contrary, as shown in FIG. 14C, when the GUI used is such that a second touch position is moved (S38), the touch position coordinates are calculated by $A_n=A_{n-1}$, and $B_n=2N-A_{n-1}$, (S40). After the states S39 and S40, control is returned to state S36. If the movement distance exceeds the threshold value, it is determined that one of the touches is released and control is returned to state S32 (S37).

As has been described above, in this embodiment of the present invention, the graphic processing can easily be performed with a small number of operations even when using a touch panel. Moreover, a user can use his/her thumb for input operation instead of grasping the portable computer. Moreover, even when two points are simultaneously touched, the user interface can be set so that one of the two points is fixed while the other point movement coordinate can easily be calculated. This significantly simplifies a command creation by a coordinate movement.

As has been described above, according to the present invention, it is possible to easily perform a graphic processing even when using a touch panel. Moreover, the thumb of the hand grasping the portable computer body can be used as input means. Moreover, even in the case of a pressure-sensitive (resistance film type) touch panel, it is possible to detect a movement of one of the two points touched, thereby enabling to create a command by two-point touch movement.

What is claimed is:

1. A coordinate position input apparatus comprising:

a touch panel for outputting a coordinate data of a middle point when two points are simultaneously touched;

storage means for retaining coordinate position of the two points detected previously;

detection means for detecting a coordinate position of a current middle point; and calculation means for calculating a coordinate of one of the two touch points assumed to be a moving point by subtracting a coordinate position of a previous fixed point from a current middle point coordinate multiplied by 2.

2. The coordinate input apparatus as claimed in claim 1, wherein when a second point is touched while a first point is touched, the touch point of the second point is calculated according to a current middle point coordinate position and a previous first point touch position coordinate position.

* * * * *